UNITED STATES PATENT OFFICE 2,204,518

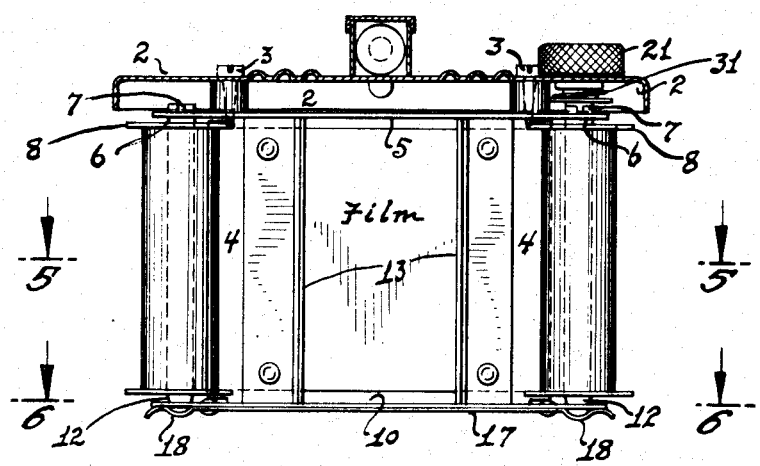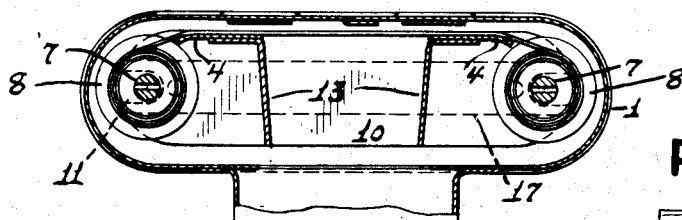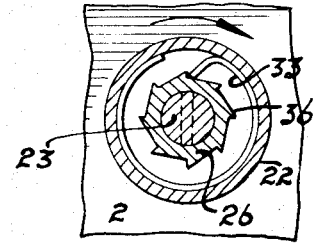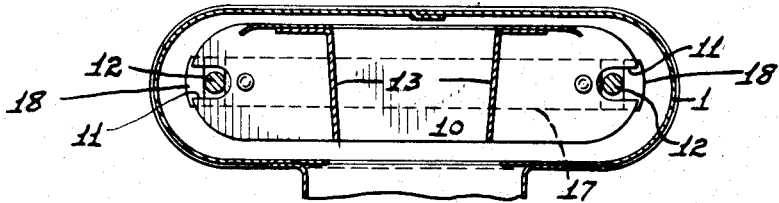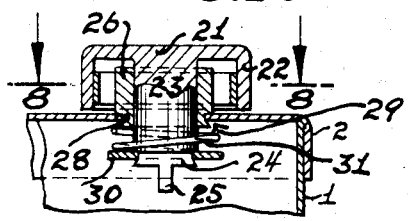

SPOOL WINDING MEANS FOR CAMERAS

Wilfred E. Tait, Milford, Conn., assignor to General Arts, Incorporated, Westport, Conn., a corporation of Connecticut Application November 3, 1938, Serial No. 238,541

1 Claim. (Cl. 242—71)

This invention relates to cameras of the so-called "candid" type.

An object of this invention is to provide a simple and low cost construction of the spool holding and spool rotating members including simple, highly effective means for holding the spools in position against lateral and axial movement and for permitting the spools to be rotated without binding or slack.

Another object is to provide an improved spool winding wheel or knob whereby the spools may be positively and smoothly turned, and which knob is provided with novel means for preventing reverse rotation and assuring positive action and freedom from free play or slack.

It is also an object of this invention to provide a camera in which the framing member will always be in alignment.

Further objects of the invention will appear with reference to the accompanying drawings, in which Fig. 1 is a front elevation of the camera;

Fig. 4 is a front elevation of the removable unit comprising image finding, image framing and spool reeling members;

Fig. 5 is a transverse section on the line 5—5, Fig. 4;

Fig. 6 is a transverse section on the line 6—6, Fig. 4;

Fig. 7 is an enlarged vertical sectional detail of the winding knob; and

Fig. 8 is an enlarged horizontal section through the film winding knob, rotatable shaft, and intermediate pawl-spring and ratchet members.

Figure 1:
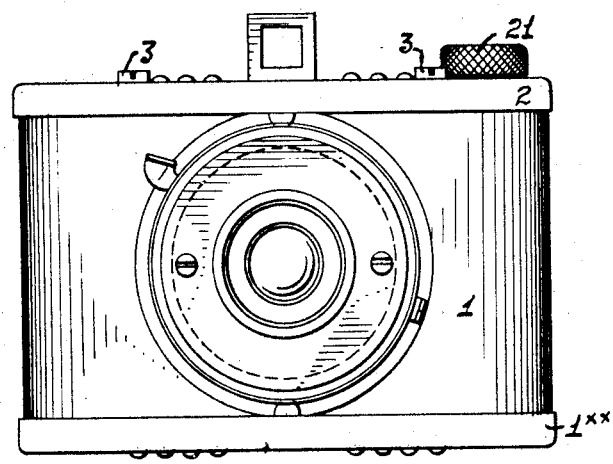
Figure 2:
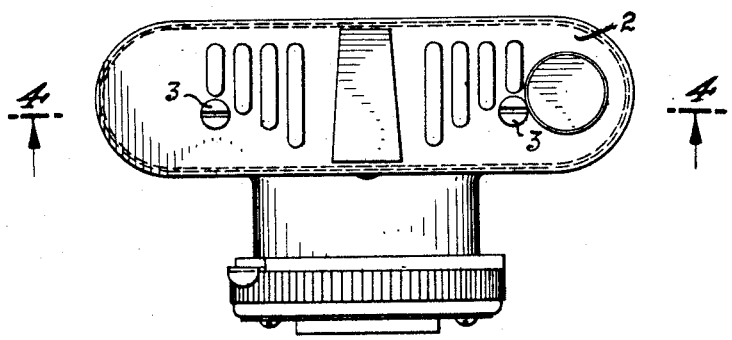
Fig. 2 is a plan view of the camera.
Figure 3:
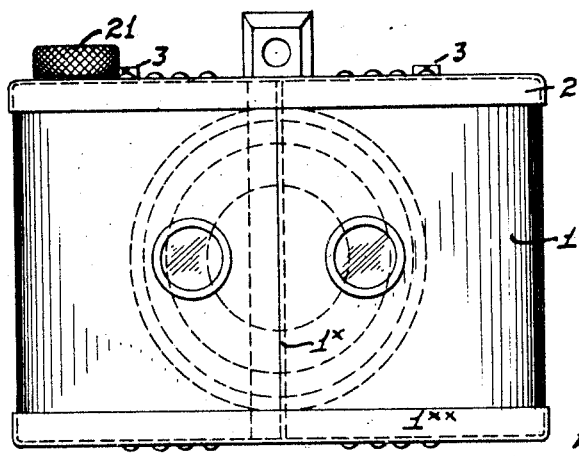
Fig. 3 is a rear elevation.

Referring to the drawings, the camera comprises a casing 1, which may be a sheet of metal bent into form and having its margins connected at 1×. The casing is closed at its base by a flanged plate 1××, and is provided with a removable flanged cover 2. The said cover has attached thereto, by means of the screws 3, 3, a frame and spool supporting bracket 4, so that the said bracket and cover may be removed as a unit.

The bracket 4 comprises a top horizontal plate 5 provided with apertures 6, 6, near the ends thereof. Into said apertures are adapted to be inserted the slotted ends 7, 7, of film spools 8, 8, and intermediate said apertures are threaded openings for receiving the said screws 3, 3. The base plate 10 is provided at its ends with open slots 11, 11, to receive the lower ends 12, 12, of the said spools. Carried between said plates is the image framing member 13. The bottom plate has riveted thereto a flat, narrow, spring 17, each end 18 of which is bent into a sinusoidal form to provide a socket for one end 12 of a spool, the said ends of spring 17 causing an axial pressure against the lower ends of the spools in the direction of the upper plate to prevent lateral shifting or free play of the spools.

The spools are reeled by means of the winding cup-like knob 21 having a skirt 22 and a central stud 23 culminating in a flattened flaring portion 24 and a key portion 25. The said stud passes through a bushing 26 exteriorly formed with serrations or ratchet teeth; and the bushing has near its end a circular groove 28 which recesses in the wall of the opening 29 in the cover, the end of the bushing being beaded over so as to secure the bushing to the cover. A washer 30 is supported on the flattened portion 24 and a light coiled expansion spring 31 is disposed between said washer and the end of the bushing so as to force the key into the slot of the spool, whereby the winding member will be firmly held in place and whereby it cooperates with the socket at the lower bracket to hold the spool against axial and lateral movement.

In the cup-like knob 21 is disposed a flat circular pawling expansion spring 33 and one end of which is provided with an inwardly bent finger portion which rides over the teeth 36 of the ratchet in one directional movement of the knob and which engages the teeth to hold the knob against reverse rotation, inasmuch as in such attempted movement of the knob the spring tends to expand and frictionally bind its flat surface against the inner wall or skirt of the knob.

The association of the coiled expansion spring and the sinusoidal end of the flat spring 17, provides an inexpensive and highly effective means for assuring and maintaining the spool in position, free of play and lateral shifting. This insures against slack in the film, and the spools while being firmly held in place yet may be readily removed and reinserted. The frame being rigidly secured to the upper and lower plates and the upper plate being attached to the cover, the whole is removed as a unit when the cover is removed, and when the unit is reinserted the frame will always be properly aligned.

Because the spools are removed with the unit, removal of the spools from their supporting structures and threading of film from a new spool is made easy.

Having described my invention, what I claim is:

In spool winding means for cameras, a support, a winding member carried by said support and having a circumferential skirt and a central stud terminating in a flattened portion and a key portion, a bushing for said stud secured to the said support and exteriorly formed with ratchet teeth, a washer carried by said flattened portion, a coiled expansion spring disposed on said stud between the hub and said washer, and a circular flat pawling spring engaging the inner face of said skirt of the winding member and held thereagainst by friction, said pawling spring having an inbent portion engaging the teeth of the ratchet.

WILFRED E. TAIT.